(12) United States Patent
Langford

(10) Patent No.: US 6,925,315 B2
(45) Date of Patent: Aug. 2, 2005

(54) TELEPHONE HANDSET WITH THUMB-OPERATED TACTILE KEYPAD

(76) Inventor: Fred Langford, 212 Crest Rd., Cape May Court House, NJ (US) 08210

( * ) Notice: Subject to any disclaimer, the term of this patent is extended or adjusted under 35 U.S.C. 154(b) by 548 days.

(21) Appl. No.: 10/011,383

(22) Filed: Oct. 30, 2001

(65) Prior Publication Data

US 2003/0083020 A1 May 1, 2003

(51) Int. Cl.[7] .......... H04M 1/00; H04M 9/00; H04B 1/38; H04B 17/02
(52) U.S. Cl. .......... 455/575.1; 455/90.2; 455/90.3; 455/128; 455/347; 379/433.01; 379/433.06; 379/433.07; 379/55.1; 379/56.3
(58) Field of Search .......... 455/575.3, 128, 455/90, 550.1, 575.1, 90.2, 90.3, 73, 403; 379/368, 433.06, 433.07, 55.1, 56.3, 433.01; D14/138

(56) References Cited

U.S. PATENT DOCUMENTS

| | | | |
|---|---|---|---|
| 407,715 A | * | 3/1889 | Grant .......... D14/138 |
| 5,383,091 A | * | 1/1995 | Snell .......... 361/679 |
| 5,701,123 A | | 12/1997 | Samulewicz |
| 6,067,358 A | | 5/2000 | Grant |
| 6,137,426 A | | 10/2000 | Roth |
| 6,164,853 A | * | 12/2000 | Foote .......... 400/489 |
| 6,535,461 B1 | * | 3/2003 | Karhu .......... 368/10 |
| 6,593,914 B1 | * | 7/2003 | Nuovo et al. .......... 345/169 |
| 6,657,560 B1 | * | 12/2003 | Jung .......... 341/22 |

* cited by examiner

*Primary Examiner*—William Trost
*Assistant Examiner*—Kiet Doan
(74) *Attorney, Agent, or Firm*—Duane Morris LLP (57) ABSTRACT

An improved cell phone arrangement has a centrally located orientation key, for referencing a location tactilely via the user's thumb, and the dialing keys arranged in a substantially circular arrangement around the orientation key, in an array having a relatively large diameter but within range of motion of the thumb. The keys are shaped and spaced for tactile reference, i.e., for dialing without the need to look at the keyboard after becoming familiar with it. Cardinal compass-points can be marked by distinct keys, which extend radially outwardly from the central reference point and are of different shape and feel from the dialing keys. The phone housing has finger ridges on one or both sides, and optionally a distinct ridge or bump on the back of the housing, for repeatable positioning of the hand.

6 Claims, 10 Drawing Sheets

CROSS SECTION A-A (DIAGONAL)

CROSS SECTION B-B

FIG. 4

CROSS SECTION C-C

TELEPHONE HANDSET WITH THUMB-OPERATED TACTILE KEYPAD

FIELD OF THE INVENTION

The invention relates to keypads for manual data input into small or hand-held electronic devices, and particularly to a numeric keypad made ergonomic by a particular key configuration. The inventive keypad has keys or pushbuttons that are tactilely differentiable and are spatially arranged relative to one another and relative to a housing, so as to be accessible for operation with the user's thumb, without substantial visual monitoring of thumb position.

BACKGROUND OF THE INVENTION

Hand-held mobile electronic devices, such as cellular and digital telephones, are popular for personal and business use. The availability of ready mobile communications has numerous benefits, but cell phone use also may involve risks. Attention paid to the cell phone detracts from the user's ability to pay attention to other things. This is a particular problem when people attempt to use cell phones concurrently with potentially dangerous activities, such as operating automobiles.

Talking on a cell phone generally requires the user to hold the phone to the user's head, such that the audio speaker and microphone are adjacent to the user's ear and mouth, respectively. This usually requires the user to allot sole use of one of the user's hands to the phone. If the user is talking on the phone while driving, then one hand is on the wheel for steering and the other hand is on the phone.

Routine operations that arise while using a cell phone, and others that arise while driving, may lead the user to devote one or both hands to such operations. A driver of a standard transmission vehicle, for example, may need a free hand to shift gears. A driver may need to find change for a toll or to pick up a map. A user of a cell phone, on the other hand, may wish to hold the phone in one hand and use the other hand to operate the phone keypad when dialing. A cell phone user in an animated conversation may even feel the need to gesticulate.

Obviously, there are only two hands to go around. In these and similar situations, the cell phone user/automobile driver typically chooses some sort of accommodation. The user might release his/her grip on the steering wheel, or attempt to steer with his knees, or lay his head over to hold the phone between his ear and his shoulder or otherwise attempt either to free a hand or to use the same hand for two concurrent operations. In many cases, an attempt to perform two operations at once detracts from the effectiveness with which either or both of the operations are accomplished, presenting a danger to the driver, passengers, other drivers, pedestrians, and physical property.

Some states and municipalities have banned cell phone use when driving. Others have mandated the use of "hands free" cell phones or attachments to be used while driving. Such restrictions are widely ignored by cell phone-using drivers.

"Hands-free" phones or phone attachments reduce the need for the user to remove one or both hands from the steering wheel in order to hold the cell phone in an operative position. But hands-free mountings, head-sets and the like are only a partial solution. There is a substantial additional distraction involved with respect to controlling the phone, especially for initiating calls. In order to dial the phone or otherwise operate the phone keypad, there is an even more dangerous distraction, because the user is typically required to look directly at the cell phone keypad and thus takes his eyes off the road.

Cell phones have an array of pushbuttons for making operational selections and for selecting numbers. In a sequence of operations beginning with turning the phone power "on" and proceeding through selecting a "call" function and usually selecting a sequence of numbers, the user must find, select and operate one appropriate key or switch in an array presented on the keypad. The selected switch typically is depressed with a digit (a finger or thumb).

Finding and operating a needed key distracts the operator from the environment, for example decreasing the attention paid to the road while driving. The lapse of attention may be brief, but even an experienced user needs to look at the keypad in order to orient his fingers to a reference position relative to the keypad before beginning a sequence of key strokes. More likely the user watches the keypad and/or display screen continuously, while moving a finger from key to key. To initiate a call, at least a seven or ten digit number must be entered. Whether this takes a long time or a short time and/or whether the user proceeds continuously or intermittently, the user is substantially required to take his eyes off the road and to focus at a closer point, namely on the phone keypad. During the time when his visual attention is on the phone instead of the road, the driver may be oblivious to changes in traffic, or may suffer loss of accurate directional control, and at least has a decreased reaction time to deal with emerging events.

This problem is compounded by keypads or key sequences that require a great deal of attention. For example, keypads with a large number of keys in an array, or with relatively small keys, or keys that are very close to one another compared to the size of fingers, or keys that are distinguishable only by small printed labels, may require undivided attention to operate.

The trend is for cell phones, like other personal electronic devices, to be made smaller and smaller. Small size is perceived as an aspect of quality. Cell phone manufacturers compete to produce the smallest phone on the market. As cell phone size is reduced, keypads become smaller as well, including the size of the keys and the spaces between the keys. Smaller keypads require more attention and care to operate accurately than do older, more-spacious models.

Problems with decreased attention, loss of control and/or decreased reaction time are known and are considered to be contributing causes of certain accidents. Attempts have been made to lessen the visual interruption and distraction entailed in dialing a cell phone. For example, a cell phone may be programmable to store a database of frequently called numbers, or a scrolling list of selectable names and corresponding phone numbers. An entry is selected and the associated number is called using a minimal number of keystrokes.

Scrolling databases reduce the need for keystrokes at times, but they too are only a partial solution to the lapse-of-attention problem. It is still necessary for the user to find and operate some keys. The user still must look at the phone, specifically at the scrolling display, to make a selection. Under some circumstances, driving and selecting a phone number using a scrolling name database, can require at least as much attention as dialing a remembered number. Depending on the number of names programmed, it may take longer to find and select a desired name/number than it would have taken to dial it outright.

A similar function to scrolling is the "speed-dial" function. As in a scrolling list, a full telephone number is pre-programmed and can be selected for dialing using a smaller number of keystrokes than is provided for all the digits of the number. Typically, the user's most frequently called numbers are associated with selected speed-dial numbers. For example, after selecting a speed-dial function, the "1" key may cause the phone to dial the user's home, the "2" key to dial his place of work, etc. This is helpful but still requires attention. The user needs to look at the phone.

Lighted dials are helpful. Standard keypad layouts are helpful. Typically, numeric keypads are standardized to the same layout as adding machine keypads. This is particularly helpful if the user is a regular user of such a numeric keyboard. Although any arrangement that reduces the need to look at and operate keys on the phone is helpful, known cell phones do not adequately address the problem. While dialing the phone or while selecting a function or selecting a number for the phone to dial automatically, a user is visually and mentally distracted. The user is not on the lookout for danger. If the user is driving an automobile, an accident may be waiting to happen.

U.S. Pat. No. 6,067,358—Grant addresses certain problems associated with dialing a phone while driving. Grant discloses a telephone handset having a head and base portions, with the head portion having a plurality of keys arrayed circularly, namely in a clock-face pattern. A rotatable plate is provided at the center of the array and has detents defining number positions, i.e., positions at which the rotatable plate can be placed to correspond to selected ones of the keys. The rotatable plate and keys serve as two alternative methods for selecting numbers on the clock face when controlling or dialing the phone.

In Grant, whether using the keys or the rotatable plate controller, the user operates the phone with his or her index finger. The phone may be held in one hand and operated using the fingers of the other hand. Alternatively, the user's thumb and the fingers other than the index finger, are placed on opposite lateral sides of the handset housing for holding the housing. The rotatable plate is in a position to be operated by the index finger.

For one-hand operation during dialing, it is necessary in Grant to hold the phone from the front. The index finger is the natural finger to use for tracing a circle on the front of the housing, specifically for operating the rotatable plate. The index finger is generally articulated for hinging at the proximal end of the finger (the knuckle) on an axis in the plane of the palm. Apart from hinging, this knuckle joint has limited lateral freedom. The index finger can trace a circle having a diameter of a few centimeters, with good dexterity.

An object in Grant is to reduce the need to look at the keypad to operate the keys. This object would not be met simply by providing the rotatable plate alternative form of input, because the user would need to look at the position of the plate to determine the number being selected at any given detent position, by regarding the plate as a rotatable pointer. Therefore, the Grant cell phone also comes with a built in audio synthesizer that audibly announces the number selected by the rotatable plate.

In Grant, the user manually selects a number and the processor in the cell phone announces the selection in a manner recognizable to the user. It would also be possible to envision a processor having voice recognition capability, whereby the user announces a number and the processor recognizes and dials it. There have been substantial advances in data processing power and the cost of digital memory is trending down, but voice recognition systems and similar technically demanding solutions might not be the most cost effective way to deal with the dangers of cell phone attention lapse.

A need remains for an optimal solution in terms of effectiveness, low cost, ease of operation and the like, that will enable a user to operate a cell phone keypad with little or no need to avert his eyes and attention to the keypad, and perhaps away from emerging dangers, for example encountered while driving a car.

SUMMARY OF THE INVENTION

It is an object of the invention to provide an improved data input device, especially a cellular telephone keypad. According to an inventive aspect, an improved cell phone keypad is configured in a clock face circular arrangement including at least some distinctly shaped keys, providing a familiar layout for the numbered key positions and providing tactile references, making it possible for the user to navigate around the keypad with little or no need to look at the keypad continuously or frequently, while facilitating the ability of the user to find and operate a sequence of desired numbered keys.

According to another inventive aspect, the cell phone keypad and the cell phone housing are configured to optimize the keypad for operation by the user using the thumb of the same hand that is holding the cell phone. The keypad is capable of operation with any finger but the key layout, angular spacing in the clock face array, key shaping and other characteristics are particularly arranged to facilitate operation of the keys with the thumb while supporting the cell phone housing on the palm of the hand. The user's fingers and the base of the thumb rest against the lateral sides of the housing. In this position, the thumb can reach the keys on the top or front of the housing and comfortably operate them in a circular array.

Generally, the invention provides a cell phone keypad that can be dialed with minimal need for the user to divert his/her attention to looking at the keypad. The invention is configured to repeatably locate the cell phone at a predetermined position relative to the thumb. This positioning, plus certain tactile references that are provided, enable the user to operate the keypad without looking at it, with reasonable efficiency and accuracy.

These and other objects are met by an ergonomically optimized keypad according to the invention. The keypad is disposed on a housing, preferably a handheld housing. A plurality of keys are located around a central reference position, preferably a reference position identified by an orientation key that is functional as an input device with one or more selectable operations, but potentially simply provides a tactilely discernable form for locating a position on the keypad or an orientation of the keypad on the housing. The orientation key serves as a reference for the position of the user's thumb, preferably defining a point of origin. At least the position and preferably also the angular orientation of this key are discernable by the user tactilely, with the user's thumb. The orientation key is readily differentiated from the other keys, and provides reference to a familiar home position and orientation that the user can sense by passing the thumb lightly over the keypad.

It is possible for the user to operate the keypad after briefly becoming familiar with its layout. However over time, as use of the keypad becomes habitual, and particularly with practice in use of the keypad without looking at it, the user becomes clued into the tactile aspects and can operate the keyboard with ease, speed and accuracy comparable to that of a user of a conventional keyboard that habitually looks at the keypad to operate it.

One or more numerical and/or control keys are disposed around the orientation key, preferably in a circular pattern. Each key preferably occupies a distinct angular arc in this circular pattern. That is, the key widths and their distances from the center of the pattern is such that no two of the keys occupy or overlap in the same pie shaped sector. At least at a given radial distance from the center point of the array, the keys have angularly distinct sectors.

In addition, the number and/or control keys preferably have distinct shapes to facilitate identifying them tactilely. More particularly, the number and control keys are different from the orientation key and preferably at least some of the keys are shaped differently from others, to define a distinct pattern. Preferably the pattern is circular but angularly spaced number and control keys in the circular pattern have different and distinct shapes. At least some of these shapes are advantageously referenced to the orientation key, for example being radially elongated or distinctly tapered or shaped in a radial direction relative to a center defined by the orientation key or a part of the orientation key. Alternatively or in addition, surface variations can assist in providing a distinct pattern, including protrusions (bumps) or depressions (pits) that may have discernable shapes, surface treatments such as knurling or the like, distinct surface materials and so forth.

According to the embodiment shown, the shape distinctions provide a set of radially longer and shorter key shapes or footprints in an array wherein certain keys represent cardinal points or vector directions relative to the center, and other keys represent intermediate points. Such a configuration is similar to some compass configurations, but the number of vector directions is unlike the layout of a compass. Although the four cardinal directions are represented (NESW) by elongated marker keys, there are two intermediate keys or points between each, rather than one. The circular array thus totals twelve keys, of which four are cardinal marker keys.

Many users are sufficiently familiar with a clock face to operate the keypad without looking, once the logic of the configuration is understood. When a user becomes familiar with the keypad, he/she can locate desired number and control keys quickly using tactile clues, with minimal if any visual assistance. The arrangement is optimized for the thumb rather than the index finger, which facilitates more dexterous and comfortable one-hand operation than is possible when attempting similar operations using an index finger (typically requiring two hands). The dialing keys are spaced outward from the center of the array by a radial distance within the span of movement of the thumb, to a point where the circumferential space devoted to a key in the circular array is comparable to the width of the user's thumb. Distinct radial shapes (some radially longer and some shorter) further define and reference the position of the array and facilitate hands free operation.

Additional aspects, objects and advantages will be made apparent by the following discussion of examples and practical applications.

BRIEF DESCRIPTION OF THE DRAWINGS

The following detailed description and illustrations of preferred embodiments and examples of the invention illustrate and apply the invention. However reference should be made to the appended claims rather than to these examples, in order to assess the scope of the invention. In the drawings.

DETAILED DESCRIPTION OF THE PREFERRED EMBODIMENTS

This description of preferred embodiments is to be read in connection with the accompanying drawings, forming part of the entire written description of this invention. Throughout the drawings, the same or comparable elements are identified with the same reference numbers. In this description, relative terms such as "horizontal," "vertical," "upper," "lower," "right," "left," etc., well as derivatives thereof (e.g., "horizontally," "vertically," "upwardly," etc.) refer to the orientation in the situation then being described or as shown in the drawing figure under discussion. These relative terms are for convenience of description and are not intended to require a particular orientation unless so stated.

Figure 1:
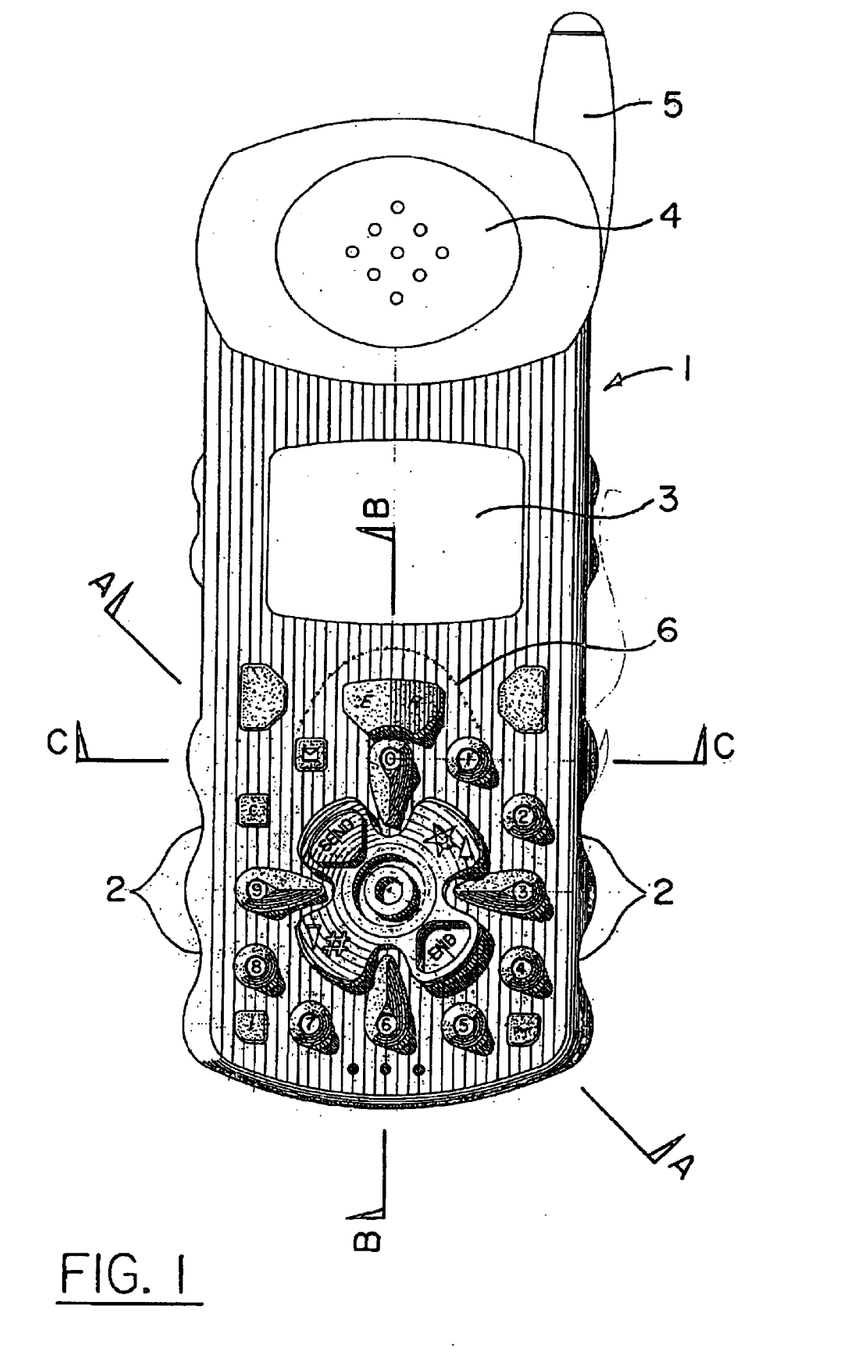
FIG. 1 is a front elevation view of a preferred embodiment of an inventive cell phone keypad.

FIG. 1 illustrates a preferred embodiment of the cell phone housing and associated keypad arrangement. Cell phone 1 has an outer housing that is formed to define one or several finger grooves 2 that provide a repeatable position at which the user can grasp the cell phone 1. In the embodiment shown, multiple grooves 2 are located on both the right and left sides of the housing of the cell phone 1. In the embodiment shown, the grooves 2 are placed in the area of the keypad, but the grooves can be more or less numerous and placed relatively higher or lower, provided that the user can grasp the phone housing repeatedly at a familiar position in which the thumb can be brought to bear.

The exemplary phone has a conventional LCD display screen 3, a receiver speaker 4, an antenna 5, a finger groove 6, and a keypad containing number and control keys, all on the front surface as shown in FIG. 1. The cell phone 1 as illustrated in FIG. 1 is the popular generally-rectilinear type. However, this example of one standard housing type is not limiting. The invention is applicable to alternative cell phone designs, such as articulated housing types ("flip" phones) as well as other shapes.

Preferably the housing details (the grooves as well as a hump on the back, described below) place the user's hand in the same or nearly the same position for dialing that the hand occupies when holding the phone against the user's head while talking after completing the dialing operation. However the user's hand could routinely be repositioned between those operations. In any event, the arrangement provides structural details that provide a familiar feel when the user grasps the housing for dialing purposes, tending to place the hand repeatably at a given position relative to the array of keys.

It is possible to have left-handed and right-handed versions, but this is not necessary. The positioning of the finger grooves 2 on opposite sides of the cell phone 1 allow either a right-handed or left-handed user to easily grip the phone between their fingers and the palm of their hand, thus allowing their thumb to be free for dialing. This is also to some extent a matter of preference (i.e., a right handed user may prefers to hold a phone handset in the left hand, and vice versa).

Figure 2A:
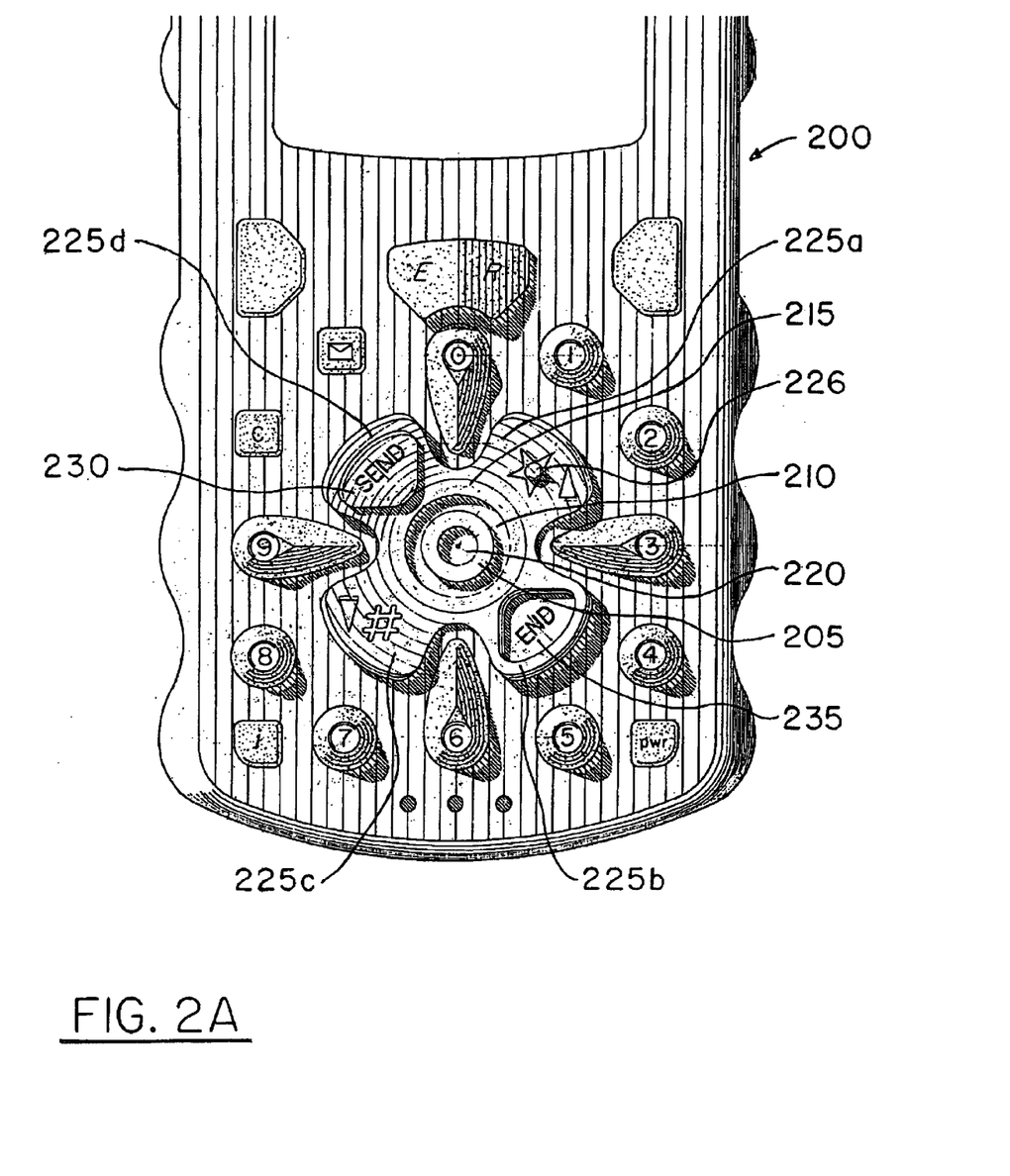
FIG. 2A is a front elevation view of a preferred embodiment of the cell phone keypad, specifically illustrating an exemplary orientation ring and four-way rocker key.

FIG. 2A shows the lower front portion of the housing of cell phone 1, specifically illustrating the inventive keypad arrangement 200. At the center of the keypad 200 is an orientation ring 205, which preferably is included as a tactile reference for the user's thumb while dialing. The user typically begins by using the reference structures including ring 205 to provide a repeatable radial origination or center, and moves from there to operation of the selected number and/or control keys. The number and control keys are found in part due to their positions relative to the origination point (i.e., their radial spacing from the center), and in part due to their angular position in the array as compared to the other keys. The inner portion of orientation ring 205 can have a recessed cavity 220.

Orientation ring 205 can comprise a soft rubber-like compound such as urethane or silicone or the equivalent. However, in the preferred embodiment the orientation ring is a hard plastic or metallic material. Thus the keys and other tactile reference structures can be subject to differentiation in various ways including their position (in plan view and/or height), shape, surface configuration, material, etc. The keys optionally can also be distinguished in additional ways, for example by visual clues such as color or backlighting, or even relative temperature by virtue of heating means (not shown). For purposes of this disclosure, tactile distinctions are of primary importance, but other distinctions are not excluded for use in situations where it is permissible to view the keypad routinely in use.

The recessed cavity 220 of the orientation ring 205 preferably has a diameter large enough for the user to tactilely distinguish the inner edge with their thumb, i.e., to feel for thumb position without the need to look at the keypad. This generally requires an inner or outer diameter portion that is of comparable size to the width of the user's thumb for easy tactile distinction. Assuming a standard two inch (5 cm) width for the cell phone housing (which of course could be varied), an inner distance of about a half inch (1 cm) is appropriate.

Orientation ring 205 forms at least part of the structure that references a home position of the user's thumb. Ring 205 provides a central reference from which the user can mentally envision and tactilely locate other desired number or control keys. However an angular reference is also needed to establish the relative positions of the number and control keys. This preferably is accomplished using a plurality of angular or rotationally distinct shapes that the user can identify and move between, to find desired keys by angular orientation well by radial as a known position on the keypad (e.g., the center). To further facilitate and emphasize the center reference of orientation ring 205, two or more forms can be spaced to provide a circular recessed channel 210 to separate orientation ring 205 from a four-way rocker key 215 that surrounds the center. This provides annular tactile edges that are readily sensed. Other similar reference shapes could be provided instead or in addition, such as radial lines extending in a starburst pattern from the center reference.

With continuing reference to FIG. 2A, a rocker key 215 is the next key proceeding radially outwardly from the reference center defined by orientation ring 205. In the example shown, the rocker key 215 is a four-way rocker, shaped essentially like a four-leaf clover. Four distinct radial protrusions 225a–d are provided. In the preferred embodiment shown, each protrusion is slightly inclined, with the portion closest to orientation ring 205 being the lowest, and the distal ends being the highest. Each protrusion may represent a different phone operation or feature, or the whole rocker can provide one switch input or perhaps two. It should be appreciated that the invention is applicable to a variety of operational choices as to which switch input will represent which specific function or option or number or character, etc. The invention is not limited to a specific functional layout, and instead provides a tactilely distinct configuration in which various possibilities arise.

The user preferably actuates the functions or inputs an option choice or a character, etc., by pressing one of the radial protrusions 225 of the central rocker key 215. In the embodiment shown in FIG. 2A, the particular radial protrusion 225d can select a "send" function of the cell phone 1. To further enhance the user's tactile recognition of this frequently used function, outwardly extending protrusion 225d can provide a tactilely distinct raised extension 230 or a similar identifiable shape.

Similarly, protrusion 225b in this example selects for an "end" phone function. This protrusion part has a recessed cavity 235, which is readily identified as different and serves tactilely to differentiate this function key from others.

Outwardly extending protrusion 225a serves as a double function key, serving as both the "*" phone key and as an "up" arrow key. Outwardly extending protrusion 225a is tactilely distinguished by a raised pin 226, which is further illustrated in FIG. 3. Similarly, outwardly extending protrusion 225c also serves as a double function key, serving as both the "#" phone key and a "down" arrow key; however, in contrast to the other protrusions, outwardly extending protrusion 225c has no tactilely distinguishing feature. It is this lack of textural feature that distinguishes the protrusion from the other 3 protrusions.

Specific functional layouts are subject to variation in accordance with the invention. In any case, the user becomes familiar with the phone by using it, perhaps initially including looking at the keypad. However with some practice, the user quickly learns the layout and can operate the keypad substantially by touch rather than sight.

Figure 3:
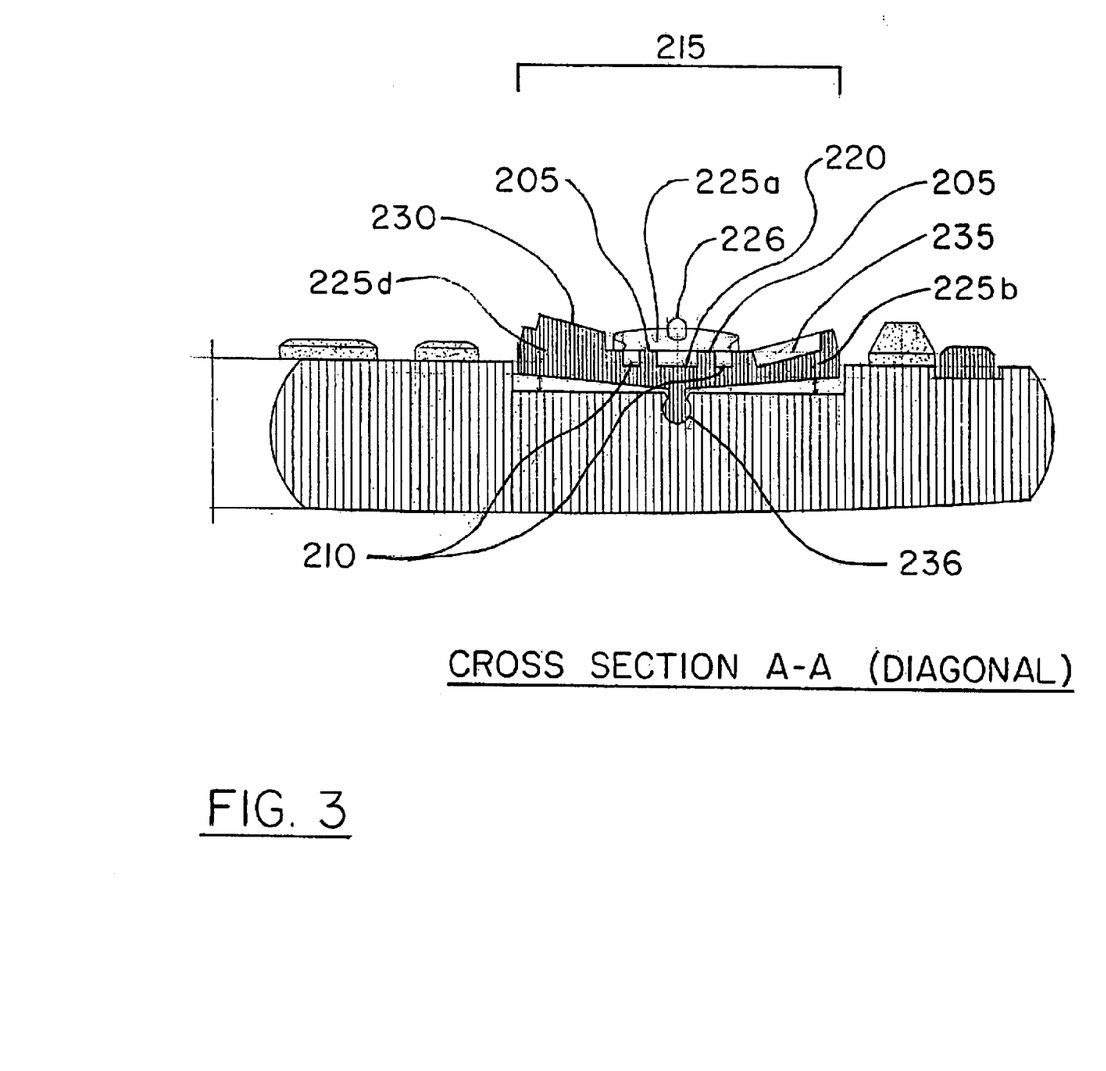
FIG. 3 is a diagonal cross section view through the cell phone keypad, illustrating aspects of the four-way rocker key, the view being taken along line A—A in FIG. 1.

Referring to FIG. 3, and also as shown in FIG. 2A, the rocker key or the functions selected by its subdivided radial protrusions are activated by manually tilting the rocker, namely depressing a point spaced from the rocker mounting, where a switch is operated by the rocker. FIG. 3 is a diagonal cross sectional view whose axis passes through the center of recessed cavity 220 of orientation ring 205. In this view, the tactile differentiation of the raised extension 230 on outwardly extending protrusion 225d, recessed cavity 235 of outwardly extending protrusion 225b, and raised pin 226 on outwardly extending protrusion 225a are clearly illustrated.

Four-way rocker key 215 is pivotable along two axis on pivot pin 236. Rocker keys and similar input devices of this sort are known and may be actuated by pressure to provide an effect on pressure responsive or position sensors, mechanically, electromechanically, optically or otherwise and may be freely movable or provided with detents or spring biases or similar arrangements. The particular form of switch can be conventional, e.g., a contact switch such as a snap membrane, or a proximity reed switch or any of various switching apparatus as conventionally used in keypads for cell phones as well as other devices.

In the preferred embodiment shown in FIG. 2A, a four-way rocker key 215 is made from metal or other hard material, such as plastic; however, a soft rubber-like compound such as urethane or silicone or the equivalent may also be used. It is also possible to use other materials or to provide a feel (by choice of material or by surface configuration) to further differentiate the keys or portions of the keys by sense of touch.

Figure 2B:
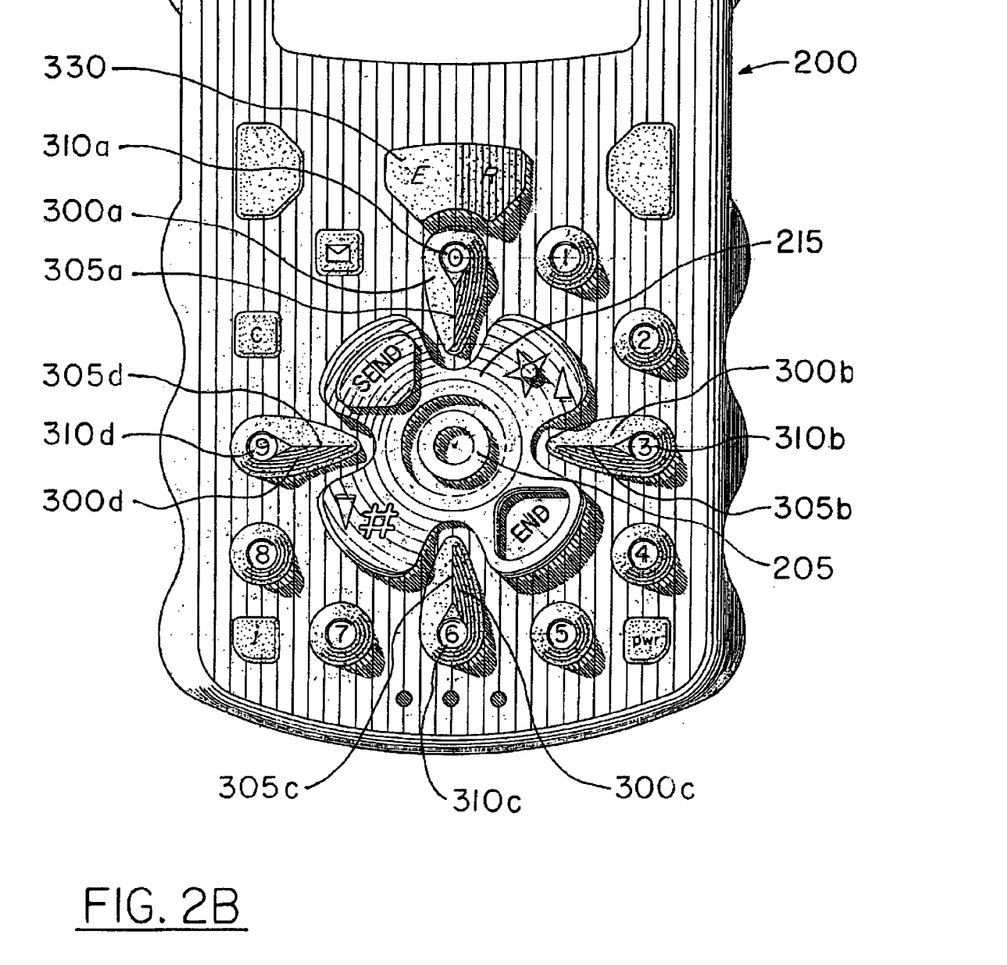
FIG. 2B is a front view of a preferred embodiment of the cell phone keypad, illustrating a preferred configuration characterized by keys distinguished for one or more compass points.

Referring to FIG. 2B, four compass-point keys 300a–d, located on the periphery of four-way rocker 215, are shown. The compass point keys provide an angular reference subject to tactile sensing by the user. The compass keys in the embodiment shown are operable keys, but it would also be possible to provide a similar angular reference using a compass-point starburst pattern or the like formed by raised ridges or by inset depressions (not shown) provided in the face of the housing, as opposed to being defined by operable keys. In the embodiment shown, the compass-point keys 300a–d are each substantially oval in shape, with the end portion closest to the four-way rocker 215 being tapered in design. Each of compass-point keys 300a–d extends radially outward in respect to orientation ring 205. The compass-point keys 300a and 300c are positioned on a vertical line intersecting a center of the array at recessed cavity 220. Similarly, compass-point keys 300b and 300d are positioned on a horizontal line intersecting the center of recessed cavity 220. In this way, each of compass-point keys 300a–d provide reference positions at ninety degree angle to any adjacent compass-point key.

Figure 4:
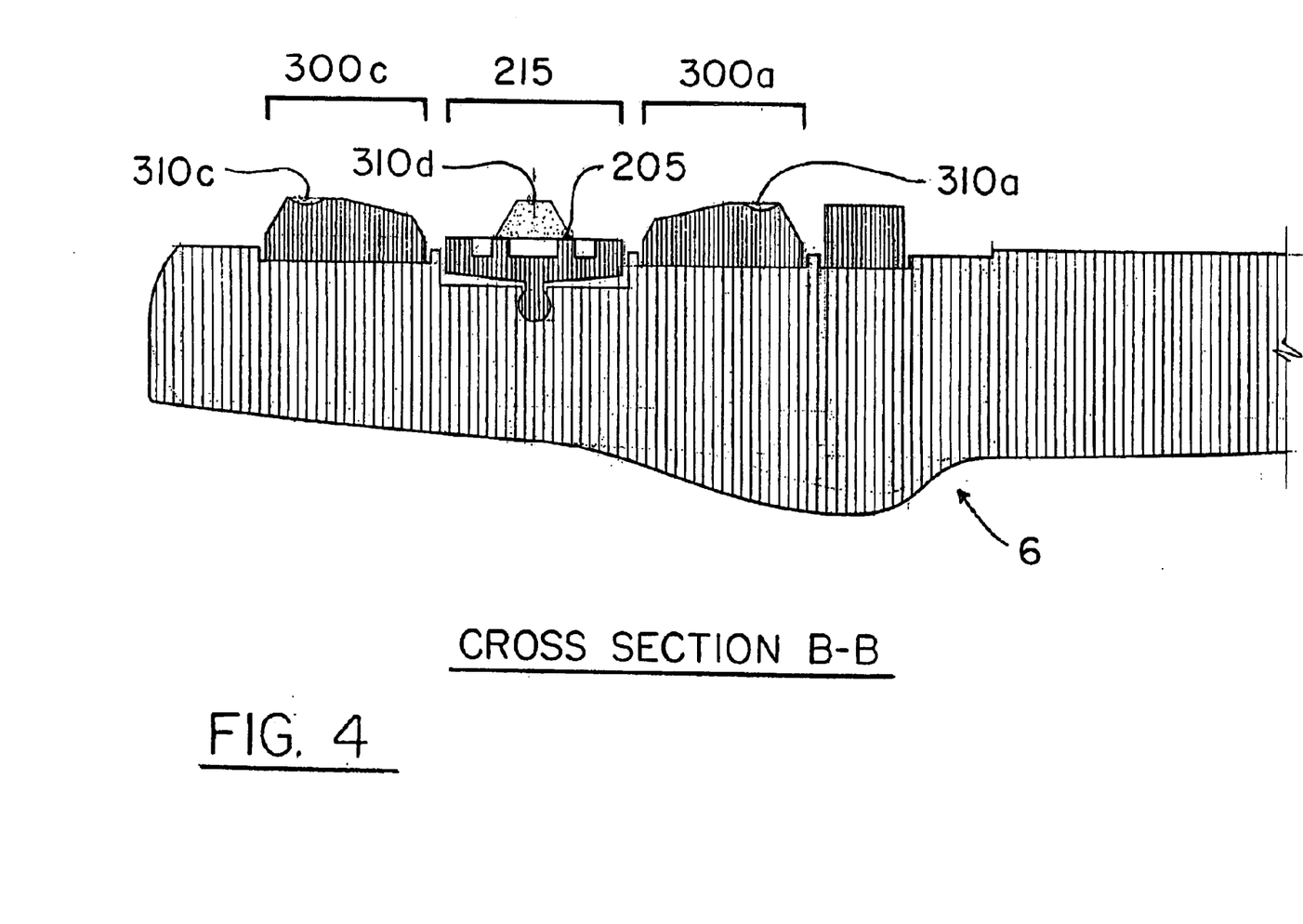
FIG. 4 is a medial cross section along line B—B in FIG. 1, showing aspects of exemplary compass-point keys and an orientation ring.

Compass-point keys 300a–d can have a distinct elevation (e.g, they can be substantially more elevated) than four-way rocker 215 and orientation ring 205, as can be seen in FIG. 4. With continuing reference to FIG. 2B and FIG. 4, each compass-point key 300a–d also is slightly inclined, with the lowest point being the tapered proximal end nearest to the four-way rocker 215. Along such inclination are guide edges 305a–d, each correlating to their respective compass-point key 300a–d. These particular arrangements are intended as examples only. For example, the compass point keys could be pointed on either or both of the radially inner end or the radially outer end and could be inclined in either direction or not inclined. Guide edges 305a–d may be knurled. The point is that the various keys are distinctive when the user feels for them with their thumb, and by identifying any of the distinctive keys, the user finds a reference that helps the user to find and possibly to operate those keys as well as other keys in the array.

The overall location and elevation of the compass-point keys 300a–d, along with their slight upward inclination and guide edge 305a–d, allow the user to tactilely differentiate between the keys, including compass-point keys 300a–d and also all the other keys in the array.

The foregoing discussion emphasizes the distinct footprint shapes of the various keys as a means to identify the keys. One or more of the keys can be further marked in a tactile manner by smaller marks that can allow tactile identification or at least can assist. For example, in the embodiment shown in FIG. 2B whereby a center is defined by ring 205, the radially outer ends of outwardly extending guide edges 305a–d, can have a small circular concave recess 310a–d at one or more locations, correlating to the corresponding compass-point key 300a–d. These circular recesses 310a–d or other similar forms that distinguish the keys from one another, further aid in tactile recognition of the compass-point keys 300a–d. The markings can be shapes or even characters. In this embodiment, compass-point key 300a is marked with indicia "0", 300b is marked with indicia "3", 300c is marked with indicia "6", and 300d is marked with indicia "9." It might be difficult tactilely to distinguish a "3" from a "9," for example, but the presence of some form of indicia on the compass point keys for major headings (NSEW) helps to distinguish those keys from others without markings or with tactilely distinct markings.

Figure 6:
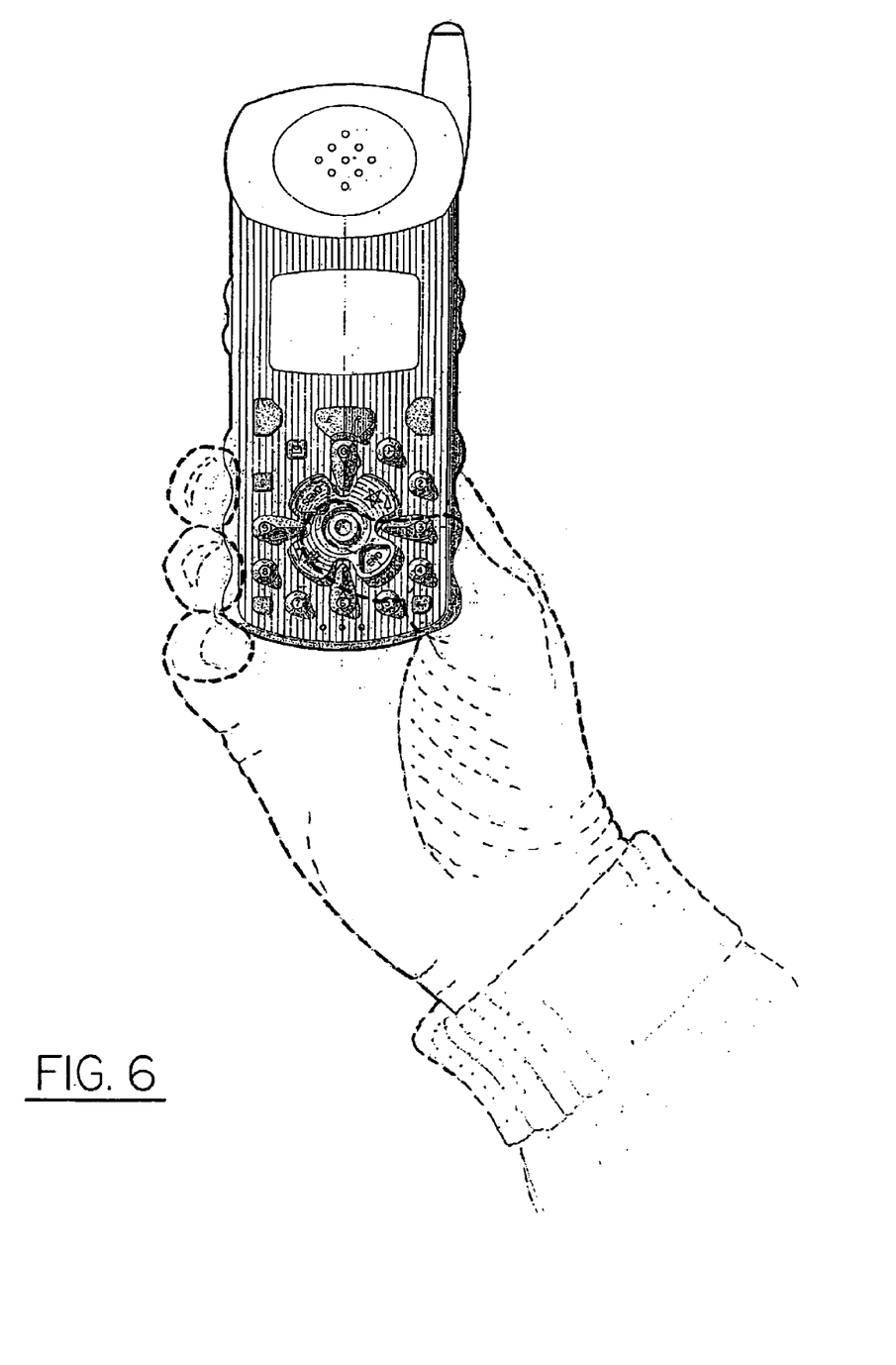
FIG. 6 is a front view of a preferred embodiment of the present invention, showing the inventive keypad in use.

With continuing reference to FIG. 2B, two-way rocker key 330 can be seen positioned slightly above compass point key 300a. Two way rocker key 330 serves as a functional key, similar to the 4 way rocker in design and construction. In this embodiment, two-way rocker key is designed with an "E" for the erase function and "R" for a repeat function. Other functions could be used in place of, or in addition to erase and repeat. Two-way rocker is located on the outer (in reference to orientation ring 205) end of compass point key 300a to serve as a stop for the user's thumb. Two-way rocker key can be substantially more elevated than the compass point keys 300 to distinguish it as a stop, i.e. to prevent the thumb from easily sliding past. In this way, a user may place his or her thumb on the orientation ring, as shown in FIG. 6, and slide their thumb up compass point key 300a until hitting two-way rocker key 330, then slide the thumb back to the orientation ring 205. This allows the user to establish a "vertical line" in which they will be able to use as yet another reference to locate the desired key.

Figure 2C:
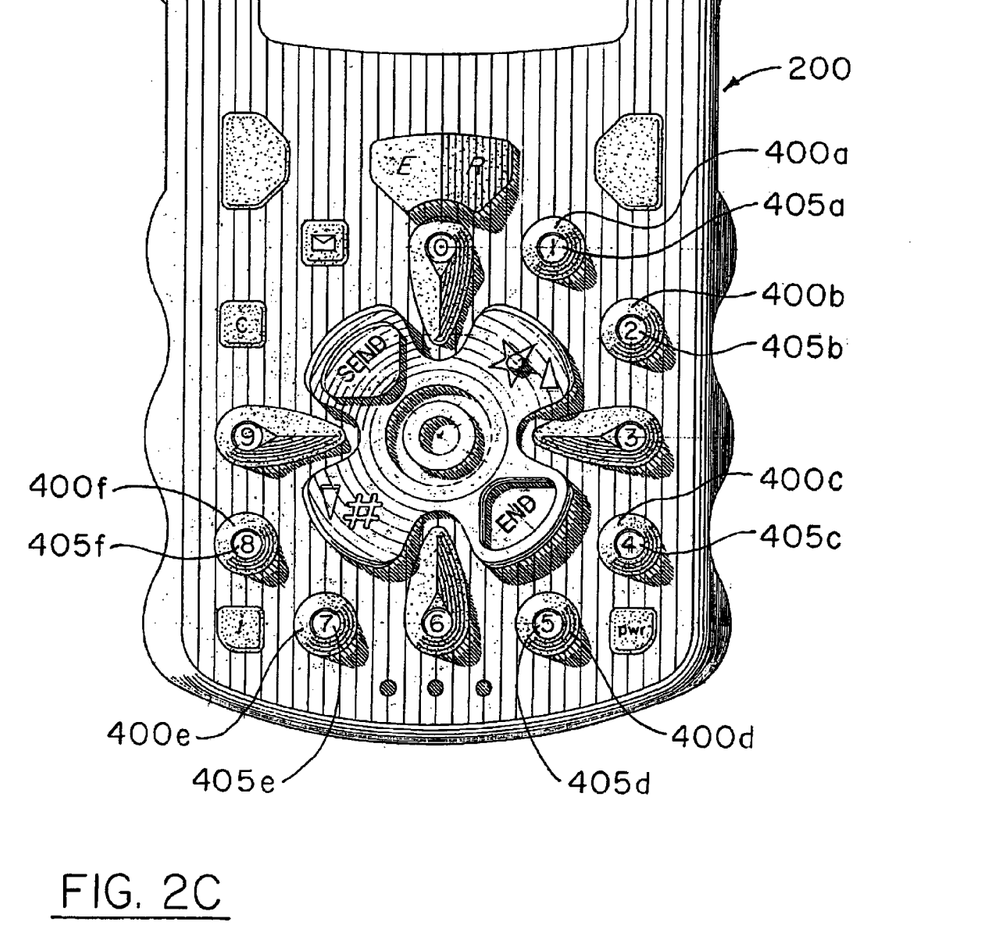
FIG. 2C is a front view of a preferred embodiment of the cell phone keypad, showing exemplary numeric keys.
Figure 5:
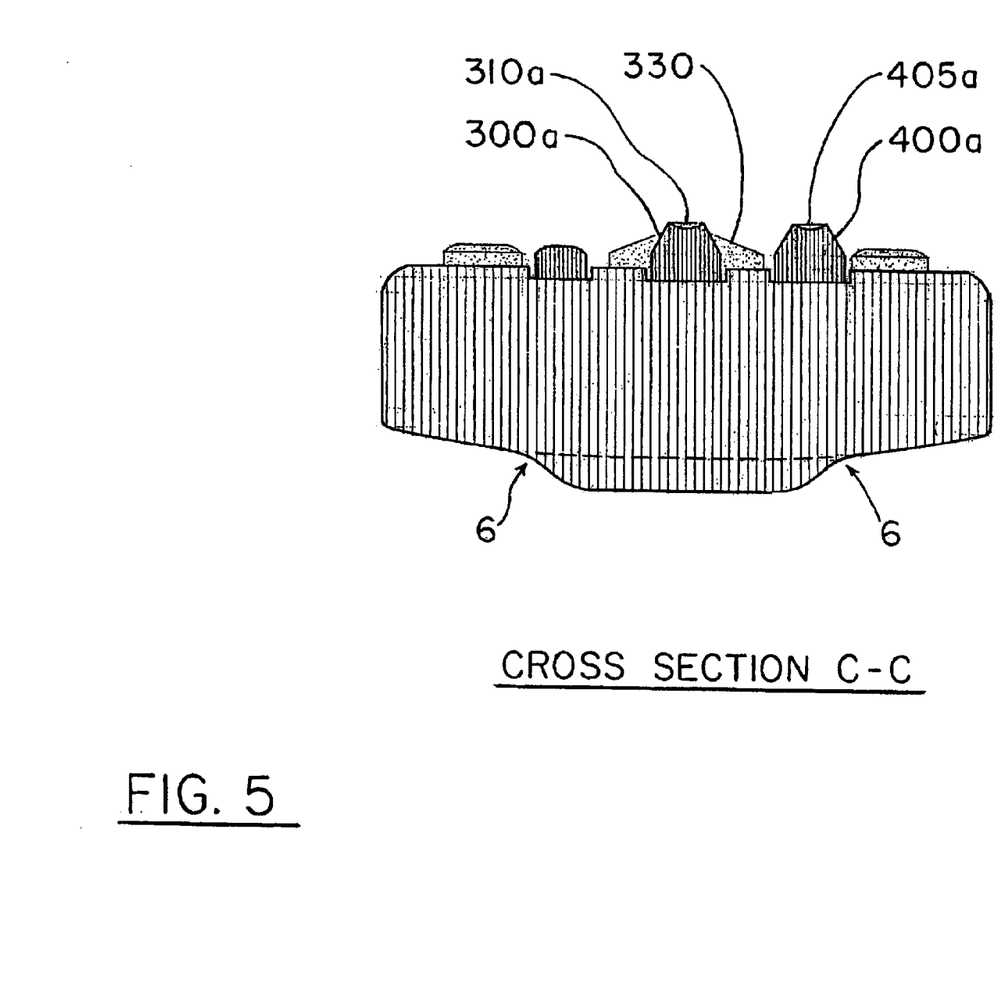
FIG. 5 is a lateral cross section view of the cell phone keypad, along line C—C in FIG. 1, specifically illustrating the numerical keys.

Other distinct markings and/or shapes include numerical truncated-cone keys 400a–f, illustrated in FIG. 2C. These keys 400a–f are positioned along the outer periphery of keypad 200, and in conjunction with circular concave recesses 310a–d on compass-point keys 300a–d, form a substantially circular arrangement around orientation ring 205. Referring to FIG. 5, and with continuing reference to FIG. 2C, each of numerical keys 400a–f consists of an elevated truncated cone, i.e., a cone with a cut-away or removed pointed end, optionally also having a circular concave recess 405a–f, in which a numerical indicia is placed. In the preferred embodiment shown in FIG. 2C, concave recess 405a is marked with the indicia "1", 405b "2", 405c "4", 405d "5", 405e "7", and 405f "8." A light may be incorporated if lighted keys are desired.

The keypad 200 substantially resembles a rotary-dial telephone face as to the numeric positions, but the individual keys are distinctly shaped for tactile identification. In the embodiment shown, each dialing key is extended radially outwardly from orientation ring 205. At a given radial distance from the center, there is more circumferential space allotted for each given key than there is at a position radially closer to the center. By arranging the housing and the keypad array for operation using the thumb, there is a greater span of displacement available than with an index finger. Therefore, the invention permits the keys to be positioned optimally at an optimal distance from the center of the array, where the angular segment allotted to each number or control key position subtends a portion of a circumference of the array that is comparable to (and preferably at least as big as the width of a key). The design allows for greater key separation than alternative cell phone keypad arrangements, as illustrated in FIG. 7.

Figure 7:
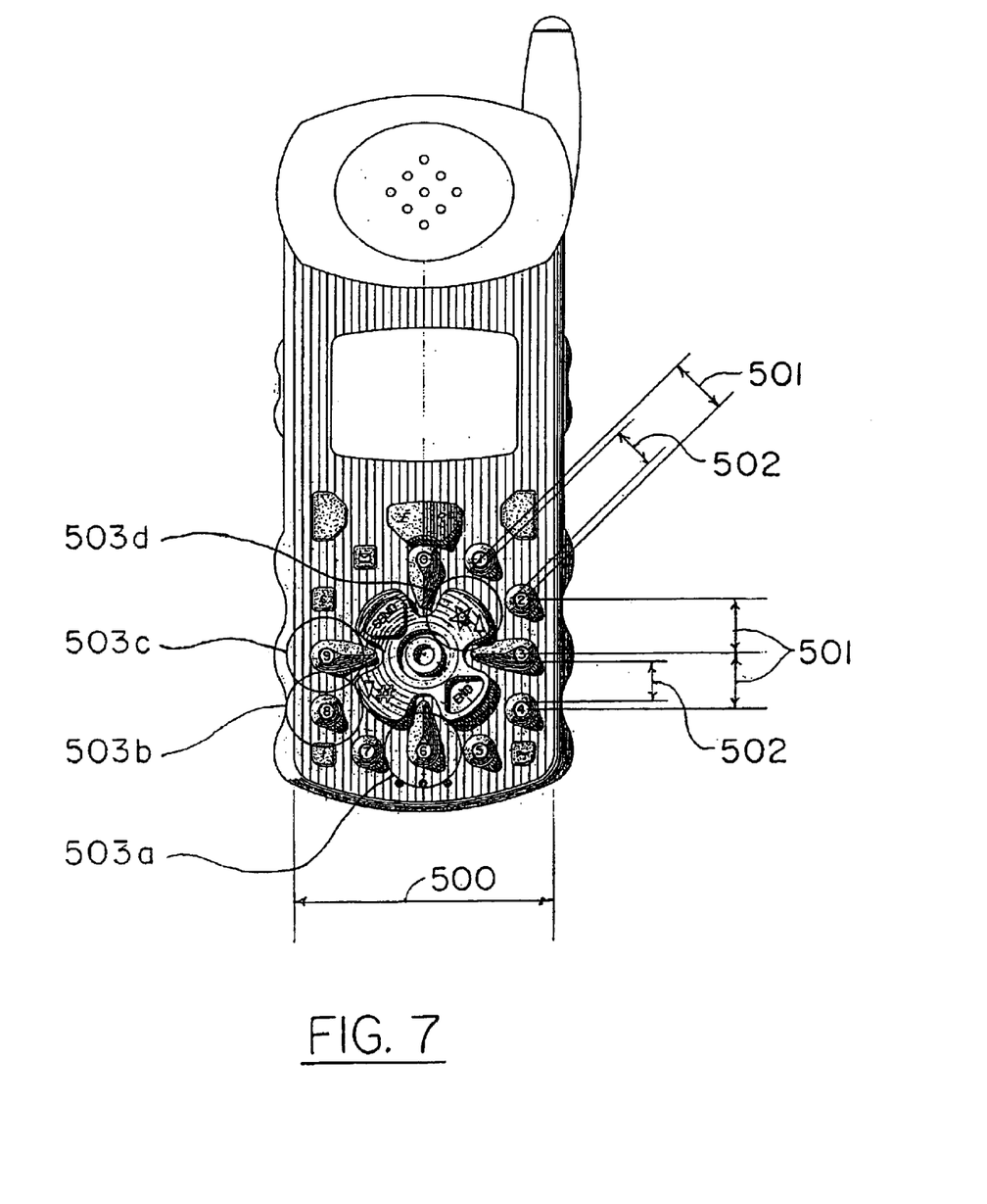
FIG. 7 is front elevation view of the cell phone keypad, specifically illustrating the superior separation of numerical dialing keys.

For example, the keypad design of the embodiment shown in FIG. 7, a cell phone having a lateral width 500, would have a distance 501 between each numeric key, measured center to center. Inner distance 502 represents the spacing between the circular concave recesses, measured circumference to circumference. According to the embodiment of the invention shown, the clock face array of numeric keys allows for maximum distance 501 and inner distance 502, with the keys still remaining within the easy span of the movement of the thumb. These increased spacing helps the user to tactilely differentiate between the keys, as each key is significantly separated from the next, therefore is easily recognizable by the user's thumb. To illustrate this point, circles 503(a–d) are drawn to represent a user's thumb. As can be seen, each key is substantially separated from each other key, and therefore the user's thumb does not accidentally encroach an adjacent key when dialing. Thus the configuration of the device in a clockface arrangement for operation with a thumb has the concurrent benefit of permitting the use of larger and/or more widely spaced keys than would otherwise be possible. Thus the invention facilitates differentiation between keys and operation of the phone by sense of touch rather than sense of sight.

Figure 8:
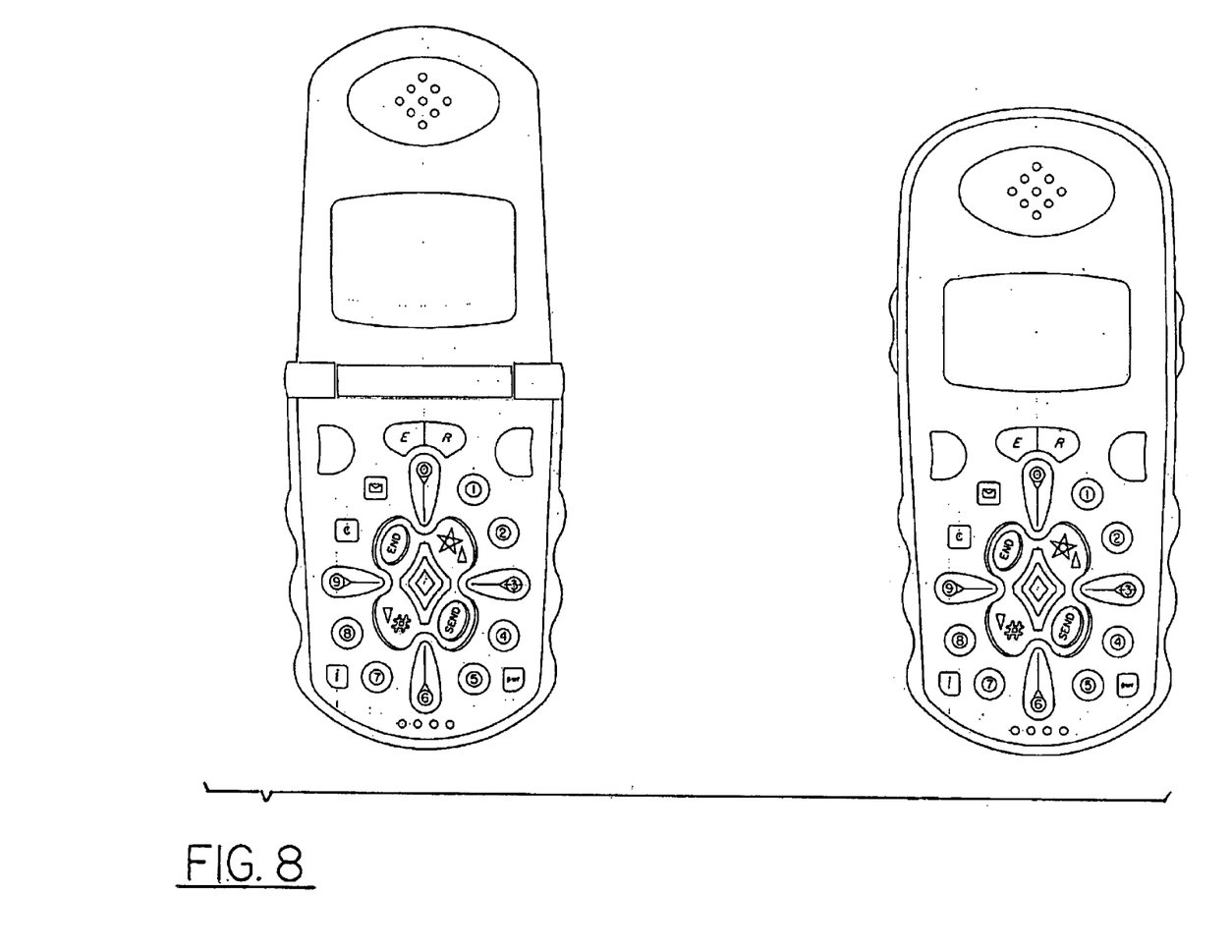
FIG. 8 is a front elevation view of an alternative embodiment of the cell phone keypad, illustrating an elliptical key array.

Conversely, if a smaller, more narrow cell phone is desired (possibly for people with smaller hands) the clock face arrangement may be used in a more elliptical design as shown in FIG. 8. By stretching the vertical axis of the keypad 200, the elliptical design allows for the same increased separation of numerical keys in a more narrowly (width) designed phone.

The invention is not intended to be limited to the particular arrangements discussed above as examples and shown in the drawings, but also encompasses reasonable modifications and equivalents within the scope of the appended claims, which define the scope of exclusive rights that are claimed.

What is claimed is:

1. A cell phone configuration comprising:
   a housing with a keypad located within range of access with a user's thumb while holding the housing in a palm of a hand having said thumb;
   a plurality of keys positioned in a standard clock face arrangement, said plurality of keys being in a substantially circular array around an origin, comprising at least number selections one through nine and zero, arrayed on the keypad for dialing the cell phone, wherein number selections three-nine and six are at reference compass points East-West and South, respectively, and also in said standard clock face arrangement, and all selections between one through nine and zero are placed on one of the compass points or at a next adjacent selection position to one of the compass points;
   an orientation structure defining reference points for tactilely distinguishing at least one of said reference compass points, thereby establishing an orientation of the keypad relative to North-South and East-West, wherein selections of said keys at the compass points are tactilely distinct from selections of keys at each said next adjacent selection position by at least one of a distinct difference in size, shape, elongation, key surface characteristic and adjacent housing characteristic, whereby a user familiar with said standard clock face can operate the keypad without needing to look for the selections.

2. The cell phone configuration of claim 1, wherein the keys in the circular array comprise numerals one through nine arranged in a clock face and wherein said orientation structure comprises at least one tactilely distinct shape on the housing associated with at least one of said keys in the circular array, establishing said orientation of the keypad relative to North-South and East-West.

3. The cell phone configuration of claim 1, wherein the plurality of keys contain four compass point keys, each of said compass-point keys radially extending outward from a centrally located orientation key having a shape defining an angular origin.

4. The cell phone configuration of claim 1, further comprising finger grooves on the housing of said cell phone, wherein said finger grooves are placed on at least one lateral side of the housing to correspond to a position of fingers of a user, whereby the housing is positioned for support on the use's palm for operation using the user's thumb.

5. A cell phone configuration comprising:
   a housing with a keypad located within range of access with a user's thumb while holding the housing in a palm of a hand having said thumb;
   a plurality of keys positioned in a standard clock face arrangement, said plurality of keys comprising at least number selections one through nine and zero, arrayed on the keypad for dialing the cell phone, said number selections comprising keys located in a substantially circular array, wherein number selections three-nine and six are reference compass points East-West and South in said standard clock face arrangement whereof recognized hour positions occur at four said compass points, and all selections between one through nine and zero are placed on one of the compass points or at a next adjacent selection position to one of the compass points;
   an orientation structure defining reference points for tactilely distinguishing at least one of said reference compass points, thereby establishing an orientation of the keypad relative to North-South and East-West, wherein the plurality of keys contain four compass point keys, wherein said orientation structure comprises at least one of the keys in the keypad being structured to be tactilely distinct from adjacent ones of the keys in the circular array, thereby establishing said orientation of the keypad relative to North-South end East-West; each of said compass-point keys radially extending outward from a centrally located orientation key having a shape defining an angular origin, wherein said compass-point keys are disposed on mutually perpendicular North-South and East-West lines terminating at least at number selections three, six and nine, whereby a user familiar with said standard clock face can operate the keypad without needing to look for the selections; and,
   wherein said compass point keys are oblong in shape and are distinct in shape compared to keys adjacent to said compass point keys.

6. The cell phone configuration of claim 5, wherein said compass point keys are elevated in relation to the centrally located orientation key.

* * * * *